(12) United States Patent
Shikama et al.

(10) Patent No.: US 12,252,765 B2
(45) Date of Patent: Mar. 18, 2025

(54) AUTOMOTIVE DOOR BEAM MADE OF ALUMINUM ALLOY EXTRUDED MATERIAL

(71) Applicant: Kobe Steel, Ltd., Kobe (JP)

(72) Inventors: Takahiro Shikama, Yamaguchi (JP); Shinji Yoshihara, Yamaguchi (JP); Misuzu Yamamoto, Yamaguchi (JP); Yuki Tanaka, Hyogo (JP); Ryo Unoki, Hyogo (JP); Takahiro Ozawa, Hyogo (JP)

(73) Assignee: Kobe Steel, Ltd., Kobe (JP)

( * ) Notice: Subject to any disclaimer, the term of this patent is extended or adjusted under 35 U.S.C. 154(b) by 670 days.

(21) Appl. No.: 17/439,028

(22) PCT Filed: Mar. 5, 2020

(86) PCT No.: PCT/JP2020/009512
§ 371 (c)(1),
(2) Date: Sep. 14, 2021

(87) PCT Pub. No.: WO2020/195690
PCT Pub. Date: Oct. 1, 2020

(65) Prior Publication Data
US 2022/0154313 A1    May 19, 2022

(30) Foreign Application Priority Data

Mar. 28, 2019   (JP) .................. 2019-064438

(51) Int. Cl.
*C22C 21/10* (2006.01)
*B62D 29/00* (2006.01)
*C22F 1/053* (2006.01)

(52) U.S. Cl.
CPC ............ *C22C 21/10* (2013.01); *B62D 29/008* (2013.01); *C22F 1/053* (2013.01)

(58) Field of Classification Search
CPC ....... C22C 21/10; B62D 29/008; C22F 1/053; B60J 5/0443; B60J 5/00
USPC ....................................................... 420/532
See application file for complete search history.

(56) References Cited

U.S. PATENT DOCUMENTS

| 2007/0074791 | A1  | 4/2007 | Yoshida et al. |
| 2009/0053098 | A1* | 2/2009 | Yoshida .......... C22F 1/053 148/689 |
| 2014/0209223 | A1  | 7/2014 | Hashimoto et al. |
| 2018/0087139 | A1  | 3/2018 | Hashimoto et al. |
| 2019/0071133 | A1  | 3/2019 | Muller et al. |

FOREIGN PATENT DOCUMENTS

| EP | 3 362 282 A | 8/2018 |
| JP | 9-268342 A | 10/1997 |
| JP | 2003-320847 | 11/2003 |
| JP | 2003320847 A | * 11/2003 |
| JP | 2007-119904 A | 5/2007 |
| JP | 2008-274441 A | 11/2008 |
| JP | 2011-144396 A | 7/2011 |
| JP | 2013-108131 A | 6/2013 |
| JP | 2014-105389 A | 6/2014 |
| JP | 2014-145119 A | 8/2014 |
| JP | 2015221924 A | * 12/2015 |
| JP | 2018-90839 A | 6/2018 |
| WO | WO 2008/123184 A1 | 10/2008 |

OTHER PUBLICATIONS

JP2015221924A Translation (Year: 2015).*
Extended European Search Report issued Apr. 12, 2022, in corresponding European Patent Application No. 20778912.4, 9 pages.
International Search Report and Written Opinion issued Jun. 2, 2020 in PCT/JP2020/009512 (with English Translation), 13 pages.
Williamson, Elevated Temperature Exposure Effects: A Comparison of 6xxx-Series and 7xxx-Series Alloys; Extrusion Technology Conference Proceedings 2016; pp. 113-123; Aluminum Extruders Council; May 2016.†
ASTM B807; Standard Practice for Extrusion Press Solution Heat Treatment for Alloys; ASTM International; pp. 548-552; Jun. 2013.†
Tkachencko, The Properties and Structure of High Strength Aluminum 1933 Alloy Forgings, Aluminum Alloys: Their Physical and Mechanical Properties—Proceedings ICAA5—Part 3, pp. 1819-1822, Transtec Publication, 1996.†
Shahani, High Strength 7XXX Alloys for Ultra-Thick Aerospace Plate: Optimisation of Alloy Composition, Aluminum Alloys Their Physical and Mechanical Properties vol. 2 Proceedings of the 6th International Conference on Aluminum Alloys: The Japan Institute of Light Metals, pp. 1105-1110, Jul. 1998.†
Aluminum Association: International Alloy Designations and Chemical Composition Limits for Wrought Aluminum and Wrought Aluminum Alloys: Aluminum Association, Arlington, VA; pp. 1-29, Jan. 2018.†
Mondolfo, Aluminum Alloys: Structures & Properties; pp. 844-864; Butterworths London—Boston; 1976.†
Duplancic, Effect of Process Parameters on the Properties of AlZnMg Alloy Extruded Hollow Shapes; Extrusion Technology Conference Proceedings 1992; pp. 559-570; Aluminum Extruders Council; May 1992.†

* cited by examiner
† cited by third party

*Primary Examiner* — Brian D Walck
*Assistant Examiner* — Danielle Carda
(74) *Attorney, Agent, or Firm* — Oblon, McClelland, Maier & Neustadt, L.L.P.

(57) ABSTRACT

A door beam of a motor vehicle includes a 7000 series aluminum alloy extruded material, the 7000 series aluminum alloy extruded material including Zn: 7.5 mass % to 9.0 mass %, Mg: 1.3 mass % to 2.0 mass %, Cu: 0.1 mass % to 0.7 mass %, Si: 0.15 mass % or less, Fe: 0.3 mass % or less, Ti: 0.005 mass % to 0.2 mass %, and at least one of Mn, Cr, and Zr: 0.1 mass % to 0.5 mass %, in which contents of Mn, Cr and Zr satisfy Mn: 0.3 mass % or less, Cr: 0.25 mass % or less, and Zr: 0.25 mass %, respectively, with the remainder being Al and impurities. A Fe-based crystallized product is contained, and an average Cu content of the Fe-based crystallized product is 5.0 mass % or less.

4 Claims, No Drawings

AUTOMOTIVE DOOR BEAM MADE OF ALUMINUM ALLOY EXTRUDED MATERIAL

TECHNICAL FIELD

The present invention relates to a door beam of a motor vehicle, including a 7000 series aluminum alloy extruded material.

BACKGROUND ART

A door beam of a motor vehicle is mounted inside a door in a front-rear direction in order to protect an occupant from a side collision of a vehicle body. The door beam is required to have impact absorption performance, and in regulations such as American Federal Motor Vehicle Safety Standards (FMVSS), for example, a certain standard is defined for a maximum load value and an energy absorption amount, determined by a three-point bending test of the door beam.

In order to achieve both high impact absorption performance and weight reduction of parts of a motor vehicle, a 7000 series (Al—Zn—Mg) high-strength aluminum alloy extruded material is used as a material of a door beam.

Patent Literatures 1 to 7 proposed a 7000 series aluminum alloy extruded material having high strength and excellent stress corrosion cracking resistance as a material for a door beam. However, the 7000 series aluminum alloy extruded material has a higher risk of causing stress corrosion cracking (hereinafter, referred to as SCC) as the strength increases.

Therefore, at present, a 7000 series aluminum alloy extruded material in which the concentrations of Zn and Mg are not so high and the proof stress is about 430 MPa is used as a material of the door beam. However, the side impact restriction on the door of the motor vehicle is further tightened in the regulations such as FMVSS, and in a case where a 7000 series aluminum alloy extruded material having a strength in a current level is used to realize a higher impact absorption performance, the weight of the door beam increases.

CITATION LIST

Patent Literature

Patent Literature 1: JP-A-H09-268342
Patent Literature 2: JP-A-2007-119904
Patent Literature 3: JP-A-2008-274441
Patent Literature 4: JP-A-2011-144396
Patent Literature 5: JP-A-2014-105389
Patent Literature 6: JP-A-2014-145119
Patent Literature 7: JP-A-2018-90839

SUMMARY OF INVENTION

Technical Problem

In order to prevent an increase in weight of the door beam and further enhance the impact absorption performance, a 7000 series aluminum alloy extruded material having higher strength is required as a material of the door beam that can be practically used.

An object of the present invention is to provide a 7000 series aluminum alloy extruded material having excellent SCC resistance in a higher strength region as a material of a door beam of a motor vehicle.

Solution to Problem

A small amount of Fe is mixed as an impurity in the 7000 series aluminum alloy. Fe forms an intermetallic compound with other elements in the alloy during the casting to form a Fe-based crystallized product in a billet. The Fe-based crystallized product formed in the billet is also present in the material after extrusion without disappearing.

The present inventors observed, with a microscope, surfaces of 7000-series aluminum alloy extruded materials held for various time in a corrosive environment in a state in which stress is applied, and found that pitting corrosion occurring in an Al base metal portion around the Fe-based crystallized product causes occurrence of SCC. The Fe-based crystallized product is also present in a large amount at a grain boundary, cracks occur from the pitting corrosion with time, and the cracks propagate to the grain boundary, resulting in the SCC.

According to the above findings, in order to improve the SCC resistance of the 7000 series aluminum alloy extruded material, it is necessary to prevent the occurrence of pitting corrosion around the Fe-based crystallized product.

The present invention has been made based on this concept, and a material of a door beam is a 7000 series aluminum alloy extruded material that includes Zn: 7.5 mass % to 9.0 mass %; Mg: 1.3 mass % to 2.0 mass %; Cu: 0.1 mass % to 0.7 mass %; Si: 0.15 mass % or less; Fe: 0.3 mass % or less; Ti: 0.005 mass % to 0.2 mass %; and at least one of Mn, Cr, and Zr: 0.1 mass % to 0.5 mass % where contents of Mn, Cr, Zr satisfy Mn: 0.3 mass % or less, Cr: 0.25 mass % or less, and Zr: 0.25 mass % or less, respectively, with the remainder being Al and impurities, in which a Fe-based crystallized product is contained and an average Cu content of the Fe-based crystallized product is 5.0 mass % or less.

Advantageous Effects of Invention

The above 7000 series aluminum alloy extruded material exhibits high strength (proof stress of 460 MPa or more) after an artificial aging treatment because the concentrations of Zn and Mg are increased. In addition, the average Cu content of the Fe-based crystallized product is 5.0 mass % or less and the potential difference between the Fe-based crystallized product and the Al base metal portion is kept low, so that pitting corrosion is less likely to occur around the Fe-based crystallized product, and SCC resistance is improved. Therefore, the door beam including the 7000 series aluminum alloy extruded material has high concentrations of Zn and Mg, and has excellent SCC resistance despite having high strength. Accordingly, an increase in weight of the door beam can be prevented and the impact absorption performance can be further improved, or further weight reduction can be achieved without decreasing the impact absorption performance.

DESCRIPTION OF EMBODIMENTS

Hereinafter, a door beam according to the present invention is described in more detail.

The composition of a 7000 series aluminum alloy extruded material used as a material of the door beam includes: Zn: 7.5 mass % to 9.0 mass %; Mg: 1.3 mass % to 2.0 mass %; Cu: 0.1 mass % to 0.7 mass %; Si: 0.15 mass % or less; Fe: 0.3 mass % or less; Ti: 0.005 mass % to 0.2 mass %; and at least one of Mn, Cr, and Zr: 0.1 mass % to 0.5 mass % where contents of Mn, Cr and Zr satisfy Mn: 0.3 mass % or less, Cr: 0.25 mass % or less, and Zr: 0.25 mass % or less, respectively, with the remainder being Al and impurities. The composition itself is not particularly different from that of the 7000 series aluminum alloy extruded material in the related art except that the concentrations of Zn and Mg are increased.

Next, individual elements contained in the 7000 series aluminum alloy extruded material are described.

Zn:

Zn forms $MgZn_2$ together with Mg and improves the strength of the 7000 series aluminum alloy extruded material. In order to obtain a high proof stress (0.2% proof stress) after the aging treatment in the 7000 series aluminum alloy extruded material, the content of Zn is required to be 7.5 mass % or more. On the other hand, in a case where the content of Zn is more than 9.0 mass %, a decrease in SCC resistance cannot be prevented. Therefore, the content of Zn is within a range of 7.5 mass % to 9.0 mass %. The lower limit of the content of Zn is preferably 7.7 mass %, more preferably 8.0 mass %, and still more preferably 8.1 mass %, and the upper limit thereof is preferably 8.8 mass %.

Mg:

Mg forms $MgZn_2$ together with Zn and improves the strength of the 7000 series aluminum alloy extruded material. In order to obtain a high proof stress after the aging treatment in the 7000 series aluminum alloy extruded material, the content of Mg is required to be 1.3 mass % or more. On the other hand, in a case where the content of Mg is more than 2.0 mass %, a decrease in SCC resistance cannot be prevented, and extrudability is deteriorated due to an increase in deformation resistance. Therefore, the content of Mg is within a range of 1.3 mass % to 2.0 mass %. The lower limit of the content of Mg is preferably 1.4 mass %, and the upper limit thereof is preferably 1.8 mass %.

The stoichiometric ratio (mass ratio) of Mg and Zn that constitute $MgZn_2$, is 1:5.38. In a case where Zn and Mg are present at the stoichiometric ratio, $C_{Zn}=5.38 \times C_{Mg}$ is satisfied, where $C_{Zn}$ is a content (mass %) of Zn in the 7000 series aluminum alloy extruded material and $C_{Mg}$ is a content (mass %) of Mg in the 7000 series aluminum alloy extruded material. On the other hand, in a case where Zn is present in excess of the stoichiometric ratio, $C_{Zn}>5.38 \times C_{Mg}$ is satisfied, and the excess content of Zn ($E_{Zn}$) at that time is calculated by $E_{Zn}=C_{Zn}-5.38 \times C_{Mg}$. In addition, in a case where Mg is present in excess of the stoichiometric ratio, $C_{Zn}<5.38 \times C_{Mg}$ is satisfied, and the excess content of Mg ($E_{Mg}$) at that time is calculated by $E_{Mg}=C_{Mg}-0.186 \times C_{Zn}$.

In a case where the excess content of Zn ($E_{Zn}$) is large, a large amount of Zn that does not form $MgZn_2$ is present in the alloy, and thus SCC resistance of the extruded material is deteriorated. On the other hand, in a case where the excess content of Mg ($E_{Mg}$) is large, a large amount of Mg that does not form $MgZn_2$ is present in the alloy, and thus the extrudability is deteriorated due to an increase in deformation resistance. From the above viewpoint, in the 7000 series aluminum alloy extruded material, the contents of Zn and Mg are preferably close to those in the stoichiometric ratio, and more specifically, the excess content of Zn ($E_{Zn}$) is preferably 1.0 mass % or less, and the excess content of Mg ($E_{Mg}$) is preferably 0.5 mass % or less. The excess content of Zn ($E_{Zn}$) is more preferably 0.5 mass % or less, and still more preferably 0.3 mass % or less. The excess content of Mg ($E_{Mg}$) is more preferably 0.4 mass % or less, and still more preferably 0.3 mass % or less.

Cu:

Cu dissolves in the grain boundary precipitate ($MgZn_2$), thereby reducing the potential difference between the grain boundary precipitate and PFZ (precipitation free zone), and preferential dissolution of the grain boundary precipitate is prevented in a corrosive environment. Accordingly, the SCC resistance of the 7000 series aluminum alloy extruded material is improved. In addition, Cu improves the strength of the 7000 series aluminum alloy extruded material. However, in a case where the content of Cu is less than 0.1 mass %, the above function is insufficient. On the other hand, in a case where the content of Cu is more than 0.7 mass %, the SCC resistance is conversely deteriorated, the extrudability is deteriorated due to an increase in deformation resistance, and the weld cracking property of the extruded material is also deteriorated. Therefore, the content of Cu is within a range of 0.1 mass % to 0.7 mass %. The lower limit of the content of Cu is preferably 0.2 mass %, and the upper limit thereof is preferably 0.5 mass %.

Ti:

Ti has a function of refining crystal grains during the casting of a 7000 series aluminum alloy. However, in a case where the content of Ti is less than 0.005 mass %, the function is insufficient. On the other hand, in a case where the content of Ti is more than 0.2 mass %, the function is saturated and coarse intermetallic compounds crystallize, reducing the formability of the extruded material. Therefore, the content of Ti is within a range of 0.005 mass % to 0.2 mass %. The upper limit of the content of Ti is preferably 0.05 mass %.

Mn, Cr, and Zr:

Mn, Cr, and Zr are precipitated as finely dispersed particles in aluminum by a homogenization treatment, and have an effect of preventing recrystallization and an effect of improving SCC resistance by preventing recrystallization. At least one of Mn, Cr, and Zr are added in an amount of 0.1 mass % or more in total. As for the at least one of Mn, Cr, and Zr, the following cases are considered: (1) only one of the three elements, (2) a combination of two of the three elements (a combination of Mn and Cr, a combination of Mn and Zr, or a combination of Cr and Zr), or (3) a combination of all of the three elements, and any one of the above (1) to (3) can be selected. However, in a case where the contents of Mn, Cr, and Zr are Mn: more than 0.3 mass %, Cr: more than 0.25 mass %, or Zr: more than 0.25 mass %, respectively, or in a case where the total content of the at least one of them is more than 0.5 mass %, the extrudability is deteriorated and the quenching sensitivity of the extruded material becomes sharp. Therefore, the content of at least one of Mn, Cr, and Zr is within a range of 0.1 mass % to 0.5 mass % in total, where the contents of Mn, Cr and Zr satisfy Mn: 0.3 mass % or less, Cr: 0.25 mass % or less, and Zr: 0.25 mass % or less, respectively.

Among them, it is preferable that Zr is preferentially added within a range of 0.1 mass % to 0.25 mass %, and Mn and/or Cr is complementarily added as necessary since Zr has a smaller function of sharpening the quenching sensitivity of the 7000 series aluminum alloy extruded material as compared with Mn and Cr. The lower limit of the content of Zr is preferably 0.12 mass %, and more preferably 0.14 mass %. The upper limit thereof is preferably 0.23 mass %, and more preferably 0.20 mass %. The upper limit of the content of Cr is preferably 0.1 mass %, and more preferably 0.06 mass %. The upper limit of the content of Mn is preferably 0.1 mass %, and more preferably 0.06 mass %.

Si:

A small amount of Si is mixed in the 7000 series aluminum alloy. Si forms $Mg_2Si$ together with Mg, and precipitates at a grain boundary. In a case where the content of Si is more than 0.15 mass %, $Mg_2Si$ is excessively formed and Mg is consumed, which causes insufficient strength of the extruded material. In a case where the content of Si is more than 0.15 mass %, seizure is likely to occur on a surface of the extruded material, and the extrudability is deteriorated. Therefore, the content of Si is 0.15 mass % or less (the lower limit being 0 mass %).

Fe:

A small amount of Fe is mixed as an impurity in the 7000 series aluminum alloy. Fe forms an intermetallic compound with other elements in the alloy during the casting to form a crystallized product (Fe-based crystallized product) in a billet. In the present invention, the Fe-based crystallized product is a general term for a crystallized product (intermetallic compound) containing Fe, such as an Al—Fe-based crystallized product, an Al—Fe—Si-based crystallized product, an Al—Mn—Fe-based crystallized product, an Al—Fe—Mn—Si-based crystallized product, or an Al—Cr—Fe-based crystallized product. The Fe-based crystallized product formed in the billet is also present in the material after extrusion (extruded material) without disappearing.

In a case where a large amount of the Fe-based crystallized product is precipitated, the toughness of the 7000 series aluminum alloy extruded material decreases. Therefore, the content of Fe is 0.3 mass % or less. The upper limit of the content of Fe is preferably 0.15 mass %. By limiting the content of Fe, the amount of the Fe-based crystallized product is reduced, and as described later, the effect of preventing pitting corrosion caused by the Fe-based crystallized product can also be expected.

Other Impurities

When casting the 7000 series aluminum alloy, impurities are inevitably mixed from various paths, such as a base metal and an intermediate alloy of an additive element, in addition to Si and Fe which are main impurities. Mixing of these impurities is also allowed within a range that does not inhibit the effects of the present invention based on JIS standards of the 7000 series aluminum alloy. The content of each element is preferably 0.05 mass % or less, and the total content is preferably 0.15 mass % or less. Among the impurities, B is mixed in the aluminum alloy in an amount of about ⅕ of the content of Ti as the addition of Ti, and the content is preferably 0.02 mass % or less, and more preferably 0.01 mass % or less.

Average Cu Content of Fe-Based Crystallized Product:

Here, the average Cu content of the Fe-based crystallized product most characterizing the 7000 series aluminum alloy extruded material according to the present invention is described.

As described above, when the 7000 series aluminum alloy extruded material is placed in a corrosive environment, pitting corrosion occurs at an Al base metal portion around the Fe-based crystallized product, and a crack occurs from the pitting corrosion and propagates to a grain boundary, and thus the SCC progresses.

The Fe-based crystallized product of the 7000 series aluminum alloy extruded material in which the pitting corrosion occurred was analyzed by an energy dispersive X-ray analyzer (EDX) and element identification was performed, and as a result, Cu as an alloy component was contained at a high concentration in the Fe-based crystallized product. It is presumed that Cu concentrated in the Fe-based crystallized product raises the potential of the Fe-based crystallized product, the potential difference between the Fe-based crystallized product and the Al base metal portion increases, and thus the pitting corrosion is likely to occur around the Fe-based crystallized product in a corrosive environment.

On the other hand, it is considered that the occurrence of SCC can be prevented by preventing the occurrence of pitting corrosion that is an original factor of SCC. Therefore, in the present invention, the average Cu content of the Fe-based crystallized product is reduced to 5.0 mass % or less. As a result, the potential difference between the Fe-based crystallized product and the Al base metal portion is reduced, the occurrence of the pitting corrosion occurred around the Fe-based crystallized product is prevented, and consequently the occurrence of SCC can be prevented. In the present invention, the content of Cu ($C_{Cu/(Fe+Cu)}$) in the Fe-based crystallized product means percentage of the content of Cu relative to the total of the content of Fe ($C_{Fe}$) and the content of Cu ($C_{Cu}$) in the Fe-based crystallized product as a reference (100%), that is, $C_{Cu}/(C_{Fe}+C_{Cu})\times 100$ (mass %).

Examples of a method for reducing the average Cu content of the Fe-based crystallized product to 5.0 mass % or less include performing a homogenization treatment of a 7000 series aluminum alloy billet under conditions of a high temperature and a long time. A homogenization treatment is performed at a temperature of 490° C. to 550° C. for 4 hours or more, and as a result, Cu that have existed at a high concentration in the Fe-based crystallized product diffuses into the Al base metal, and the content of Cu in the Fe-based crystallized product decreases. In order to reduce the average Cu content of the Fe-based crystallized product, the temperature of the homogenization treatment is preferably as high as possible. However, in a case where the temperature is too high, the pinning effect on the grain boundaries of the elements (Zr, Cr, and Mn) that prevents recrystallization decreases, and the structure of the extruded material may be coarsened. Therefore, the temperature of the homogenization treatment is preferably within a range of 500° C. to 540° C., and more preferably within a range of 510° C. to 530° C. In addition, in order to reduce the average Cu content of the Fe-based crystallized product, the time for the homogenization treatment is preferably as long as possible, but in a case where the time is too long, the structure of the extruded material may be coarsened. Therefore, the time for the homogenization treatment is preferably 10 hours or less. In the case of homogenization treatment conditions (470° C.×6 hours) generally performed in the related art, the content of Cu in the Fe-based crystallized product does not decrease sufficiently. The cooling after the homogenization treatment is not particularly limited, and may be performed at, for example, a cooling rate within a range of 100° C./h to 200° C./h.

In the present invention, the content of Cu in the 7000 series aluminum alloy itself is limited to 0.7 mass % or less, and this point is also effective in preventing an increase in the content of Cu in the Fe-based crystallized product and improving SCC resistance.

The 7000 series aluminum alloy extruded material according to the present invention can be produced by a general method for producing a 7000 series aluminum alloy extruded material, except that the conditions of the homogenization treatment are set as described above. The 7000 series aluminum alloy extruded material according to the present invention exhibits excellent SCC resistance despite showing high strength after the aging treatment, and can contribute to high strength (advanced impact absorption performance) and weight reduction of a door beam.

EXAMPLES

A 7000 series aluminum alloy billet having a diameter of 155 mm obtained by semi-continuous casting was subjected to a homogenization treatment, then heated again, extruded at an extrusion temperature of 500° C. and an extrusion rate of 3 m/min, and then subjected to fan air cooling immediately after extrusion, thereby producing a 7000 series aluminum alloy extruded material (Nos. 1 to 7). The cross-sectional shape of each extruded material was a rectangle having a thickness of 3 mm and a width of 110 mm, and the cooling rate of the extruded material was about 290° C./min. The extruded material was cooled to room temperature, and then subjected to the aging treatment of 90° C.×3 hours+ 140° C.×8 hours.

The alloy compositions and homogenization treatment conditions of the extruded materials of Nos. 1 to 7 are shown in Table 1. In the extruded materials of Nos. 1 to 6, Mg is present in excess of the stoichiometric ratio, and $E_{Mg}$ of the extruded materials of Nos. 1 to 4 is equal to 0.075 (mass %), and $E_{Mg}$ of the extruded materials of Nos. 5 and 6 is equal to 0.203 (mass %). In the extruded material of No. 7, Zn is present in excess of the stoichiometric ratio, and $E_{Zn}$ is equal to 0.298 (mass %).

The following measurements were performed using each of the extruded materials of Nos. 1 to 7. The results are shown in Table 1.

Measurement of Proof Stress:

A JIS 13B tensile test piece was sampled by machining from a central portion of each of the extruded materials of Nos. 1 to 7 in the width direction such that the longitudinal direction was parallel to the extrusion direction. Two test pieces were sampled for each extruded material. Using this test piece, a tensile test was performed in accordance with JIS Z2241, and proof stress (0.2% proof stress) was measured. The crosshead speed was set to 5.0 mm/min until the proof stress value was reached, and was then set to 10.0 mm/min. The proof stress values of Nos. 1 to 7 described in Table 1 were an average value of the proof stress values measured for the two test pieces. The case where the proof stress value was 460 MPa or more was evaluated as acceptable.

Measurement of SCC-Resistant Critical Stress:

A SCC test piece having a width of 10 mm and a length of 50 mm was sampled by machining from a central portion of each of the extruded materials of Nos. 1 to 7 in the width direction such that the longitudinal direction was perpendicular to the extrusion direction. Two test pieces were sampled for each load stress in the SCC test described below.

In the SCC test, a three-point load method of a plate bending test (JIS H8711: 2001) was employed, and the load stress to the test pieces of Nos. 1 to 7 was set to four stages of 90 MPa, 100 MPa, 110 MPa, and 120 MPa. In the plate bending test, a strain gauge was attached to a protruding surface at a central portion in the longitudinal direction of the test piece where the tensile stress was the highest, the Young's modulus was set to $70 \times 10^9$ Pa, and a strain corresponding to the load stress was applied to the test piece.

The corrosive solution used in the SCC test was a Cr acid aqueous solution (NaCl: 3 g, $K_2Cr_2O_7$: 30 g, $CrO_3$: 36 g per liter of distilled water), and the temperature was maintained at 90° C. or higher during the SCC test in order to accelerate the SCC.

The test piece (two pieces for each load stress) was immersed in the corrosive solution in a state where the load stress was applied to the test piece, and was taken out every 2 hours and visually observed whether or not cracks occurred, and the test piece in which cracks did not occur was re-immersed. This procedure was repeated up to 16 hours after the start of the SCC test. The maximum load stress at which no cracks occurred in both of the two test pieces until the end of the test was evaluated as the SCC-resistant critical stress of the test piece. The case where the SCC-resistant critical stress was 100 MPa or more was evaluated as acceptable.

Measurement of Content of Cu in Fe-Based Crystallized Product:

A cross section perpendicular to the extrusion direction in the vicinity of a center of each of the extruded materials of Nos. 1 to 7 in the width direction was observed by a scanning electron microscope (SEM). In an SEM image at a magnification of 1,000 times, at least 15 Fe-based crystallized particles were arbitrarily selected from Fe-based crystallized particles having a particle diameter (major axis) of 1 μm or more and subjected to point analysis by EDX. Based on the results of the EDX point analysis, the content of Cu ($C_{Cu/(Fe+Cu)}$) was calculated for each particle, and then an average value thereof (the average value of the contents of Cu in Fe-based crystallized particles) was determined.

An observation position of the SEM (the center position of the field of view) was set to a depth of about 100 μm from a surface of the cross section. The SEM is "JSM-IT100" manufactured by JEOL Ltd., and the EDX is an apparatus mounted on the SEM.

TABLE 1

| | Alloy components (mass %) | | | | | | | | Homogenization treatment | Average Cu content of Fe-based crystallized | Evaluation items | |
| | | | | | | | | | | | 0.2% proof | SCC critical |
| No. | Si | Fe | Cu | Mn | Mg | Cr | Zn | Ti | Zr | conditions | product (mass %) | stress (MPa) | stress (MPa) |
| --- | --- | --- | --- | --- | --- | --- | --- | --- | --- | --- | --- | --- | --- |
| 1 | 0.05 | 0.13 | 0.31 | 0.00 | 1.66 | 0.01 | 8.52 | 0.02 | 0.18 | 470° C. × 6 h | 5.2 | 519 | 90 |
| 2 | 0.05 | 0.13 | 0.31 | 0.00 | 1.66 | 0.01 | 8.52 | 0.02 | 0.18 | 490° C. × 6 h | 3.9 | 521 | 120 |
| 3 | 0.05 | 0.13 | 0.31 | 0.00 | 1.66 | 0.01 | 8.52 | 0.02 | 0.18 | 520° C. × 6 h | 3.5 | 522 | 120 |
| 4 | 0.05 | 0.13 | 0.31 | 0.00 | 1.66 | 0.01 | 8.52 | 0.02 | 0.18 | 550° C. × 6 h | 1.5 | 529 | 110 |
| 5 | 0.05 | 0.12 | 0.29 | 0.00 | 1.60 | 0.01 | 7.51 | 0.02 | 0.17 | 470° C. × 6 h | 7.2 | 504 | 90 |
| 6 | 0.05 | 0.12 | 0.29 | 0.00 | 1.60 | 0.01 | 7.51 | 0.02 | 0.17 | 520° C. × 6 h | 3.6 | 507 | 120 |
| 7 | 0.05 | 0.12 | 0.32 | 0.00 | 1.69 | 0.00 | 9.39 | 0.02 | 0.18 | 520° C. × 6 h | 2.7 | 535 | 90 |

Regarding the extruded materials of Nos. 1 to 6 shown in Table 1, the alloy composition is within the specified range of the present invention. Among them, regarding the extruded materials of Nos. 1 and 5, the conditions of the homogenization treatment received in the billet stage are at a conventional level, the treatment temperature is low, and the average Cu content of the Fe-based crystallized product is more than 5.0 mass %. Therefore, the extruded materials of Nos. 1 and 5 contain Zn and Mg at high concentrations and exhibit high strength, but have low SCC critical stress.

In contrast, all of the extruded materials of Nos. 2, 3, 4, and 6 were subjected to homogenization treatment at a high temperature for a long time in a billet stage, and the average Cu content of the Fe-based crystallized product was reduced to 5 mass % or less. All of the extruded materials of Nos. 2, 3, 4, and 6 have a proof stress of 460 MPa or more and an SCC critical stress of 100 MPa or more, and have considerably improved SCC resistance as compared with the extruded materials of Nos. 1 and 5 despite having Zn and Mg at high concentrations and exhibiting high strength.

Regarding the extruded material of No. 4, the content of Cu in the Fe-based crystallized product was the lowest, but the SCC critical stress was slightly lower than those of Nos. 2 and 3. This is considered to be because the temperature of the homogenization treatment in No. 4 was high, the function of the elements (Zr, Cr, and Mn) that prevent recrystallization was reduced, and the structure of the extruded material was coarsened.

The extruded material of No. 7 is subjected to homogenization treatment at a high temperature for a long time in a billet stage, and the average Cu content of the Fe-based crystallized product is reduced to 5.0 mass % or less. However, since the content of Zn is too large, the effect of improving SCC resistance by reducing the average Cu content of the Fe-based crystallized product is not achieved.

Although various embodiments have been described above, it is needless to say that the present invention is not limited to these examples. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from the spirit of the present invention.

The present application is based on Japanese Patent Application No. 2019-064438 filed on Mar. 28, 2019, the contents of which are incorporated herein by reference.

The invention claimed is:

1. A door beam of a motor vehicle, comprising a 7000 series aluminum alloy extruded material, the 7000 series aluminum alloy extruded material comprising:
   Zn: 8.1 mass % to 9.0 mass %;
   Mg: 1.3 mass % to 2.0 mass %;
   Cu: 0.1 mass % to 0.7 mass %;
   Si: 0.15 mass % or less;
   Fe: 0.3 mass % or less;
   Ti: 0.005 mass % to 0.2 mass %; and
   at least one of Mn, Cr, and Zr: 0.1 mass % to 0.5 mass % in total, wherein contents of Mn, Cr and Zr satisfy Mn: 0 mass %, Cr: 0.25 mass % or less, and Zr: 0.25 mass % or less, respectively,
   with the remainder being Al and impurities,
   wherein
   a Fe-based crystallized product is contained, and an average Cu content of the Fe-based crystallized product is 5.0 mass % or less, and
   in the 7000 series aluminum alloy extruded material, an excess content of Zn that is a portion of the content of Zn in excess of a stoichiometric ratio of $MgZn_2$ is 1.0 mass % or less, or an excess content of Mg that is a portion of the content of Mg in excess of the stoichiometric ratio is 0.3 mass % or less.

2. The door beam of a motor vehicle according to claim 1, wherein the 7000 series aluminum alloy extruded material comprises:
   Zr: 0.1 mass % to 0.25 mass %.

3. A method for producing the door beam of a motor vehicle according to claim 1,
   comprising:
   performing a homogenization treatment of the 7000 series aluminum alloy extruded material at a temperature of 490° C. to 550° C. for 4 hours to 10 hours to reduce an average Cu content of the Fe-based crystallized product to 5.0 mass % or less.

4. The method according to claim 3, wherein the homogenization treatment is performed for 4 hours to 6 hours.

* * * * *